United States Patent Office 2,776,396
Patented Jan. 1, 1957

2,776,396
SECTOR SCAN CONTROL SERVO SYSTEM

Willis H. Gille, St. Paul, Minn., and Robert E. Mitchell, Kent, Wash., assignors to Minneapolis-Honeywell Regulator Company, Minneapolis, Minn., a corporation of Delaware Application October 19, 1953, Serial No. 386,988

11 Claims. (Cl. 318—28)

This invention relates to apparatus for producing continuous reciprocation of a driven element between variably spaced positions and in variable time periods, and more particularly concerns an improved means for producing and controlling sector scan in propagative wave energy systems, such as sonar and radar devices. The invention is herein illustratively described by reference to its presently preferred form as applied to the control of sector scan in a sonar device, but it will be appreciated that the invention is not limited to the described details nor to the illustrated mode of application thereof. The present application concerns improvements in certain features of the subject matter disclosed and claimed in the copending application Serial No. 391,967, filed November 13, 1953, in the name of Robert E. Mitchell and entitled Coordinated Sonar System With Sector Scan Control Apparatus.

Underwater sonar devices of the pulse-echo type for continuous search purposes are employed to greatest advantage when the transducer is caused to execute sector scan as distinguished from continuous 360-degree scan. There are various reasons for this. The wake of a vessel underway contains masses of air bubbles practically blocking energy propagation through a wide sector angle to the rear of the vessel. Also the maximum permissible angular scan rate of a sonar device, even at high pulse repetition rates corresponding to short ranges must be slow compared to that permitted in radar due to the relatively low propagating speed of compressional wave energy in water. With a continuous 360-degree scan the time required for a complete scan may be so great with respect to the relative speed of the vessel and surrounding objects being detected that the indicator display (i. e. PPI or other type) of corresponding signal images on successive scans tends to be confusing. It is therefore desirable to concentrate the search in a limited sector of particular interest and thereby permit a relatively high angular scan frequency. It is also desirable for greatest utility of the sonar device that the scan sector width, direction relative to the heading of the vessel, and the scanning rate be made variable, subject to control by the operator.

A broad object of the present invention is a relatively simple and reliable sector scan control circuit achieving those ends without requiring physically movable sector limit or reversing switches, or complex relaying circuits which in prior devices added considerably to the bulk, complexity and expense of a sonar, especially if provisions were to be made therein for controlling the sector scan rate, width and direction. A related object is a sector scan control apparatus which is relatively easy to calibrate or adjust.

Still another object is a relatively compact sector scan control circuit in which the principal control means establishing the sector scan width, rate and direction may be mounted conveniently with those components of the sonar device which are located "above deck" or at some readily accessible position in the vessel. With this improved control circuit only a minimum of apparatus need be mounted "below" in direct physical association with the transducer mechanism.

As herein described the improved sector scan control circuit operates by applying progressive unbalance voltages to a normally balanced bridge circuit, the term "bridge circuit" hereinafter connoting all equivalent networks suitable for the disclosed purpose, controlling energization of servo mechanism driving the transducer. This normally balanced bridge circuit includes a follow-up potentiometer mechanically driven by the servo mechanism in a sense to restore bridge circuit balance, the potentiometer output constituting positional error voltage acting in opposition to the progressive unbalance voltages referred to above. Such progressive unbalance voltages are generated in the bridge circuit by constant speed potentiometer means, herein referred to as the "round and round" potentiometer, including a winding, a wiper cooperating therewith, and means effecting unidirectional relative rotation between such winding and said wiper. The potentiometer winding has a plurality of pairs of energizing taps arranged at interval spacings therearound, and an even number of these taps are connected with alternatively opposite polarity to a voltage source which is selectively adjustable in order to vary the magnitude or amplitude of voltage applied to the potentiometer taps, depending upon whether D. C. or alternating voltages are applied thereto. In the example alternating voltage is applied to the potentiometer winding taps, whereby the potential of the continuously rotated potentiometer wiper becomes an alternating voltage, amplitude modulated in triangular wave form, and reversed in phase every half-cycle of the triangular wave. Selector switch means interposed within the circuit between the voltage source and the potentiometer energizing taps permits selecting the number of taps so energized and thereby constitutes a highly simple and convenient means for adjusting the triangular modulation wave frequency, which determines the sector scan frequency. Certain basic combination features of such sector scan control apparatus, not specifically including the round and round potentiometer, are claimed in said copending application. Scan control apparatus featuring said round and round potentiometer forms the basis of the improvements claimed in the instant case.

The presently disclosed system also incorporates means mechanically coordinating the respective adjustments of angular scan rate and operating range, so that the two are inversely related in an optimum ratio. In this way the operator of a sonar device is relieved of the task of attempting to correlate with uncertain accuracy angular scan rate and pulse repetition rate by separate adjustments of these variables so as to achieve maximum angular scan rate without risking loss of signals due to an excessively high rate. In the particular sonar device hereinafter described by way of example, three different scan angles and three different range settings are provided. The range settings are 400, 800 and 1600 feet, respectively. The maximum scan angle obtainable is 180 degrees, and this is regarded as a relatively wide sector angle in terms of the problem mentioned just above. In this scan angle setting of the device the feature of mechanical coordination between operating range and angular scan rate adjustments becomes automatically operative for all range settings. The illustrative device also provides for an intermediate scan angle of 90 degrees, but in this setting the above-described problem of time lapse between successive scans is regarded as serious only at maximum range settings. Accordingly, angular scan rate is coordinated with range only when changing between the maximum and intermediate range settings. It is held constant at a predetermined value when changing between the intermediate and minimum range settings; whereas it is also held constant at a different value for all three range settings when the scan angle is set at the minimum value, namely 45 degrees. The advantage of holding scan angle constant at predetermined values under this latter condition lies in the fact that the sector scan control apparatus is thereby simplified and is not complicated unnecessarily by the described type of mechanical coordinating means, whereas the advantages of incorporating such means for the wide sector angle setting, for instance, far outweight the disadvantages of apparatus complexity. Certain basic features of such apparatus including the feature of coordinated scan and pulse repetition rate adjustments are claimed in said copending application.

These and other features, objects and advantages of the invention including certain details of the preferred form thereof will become more fully evident from the following description by reference to the accompanying drawings.

Figure 1:
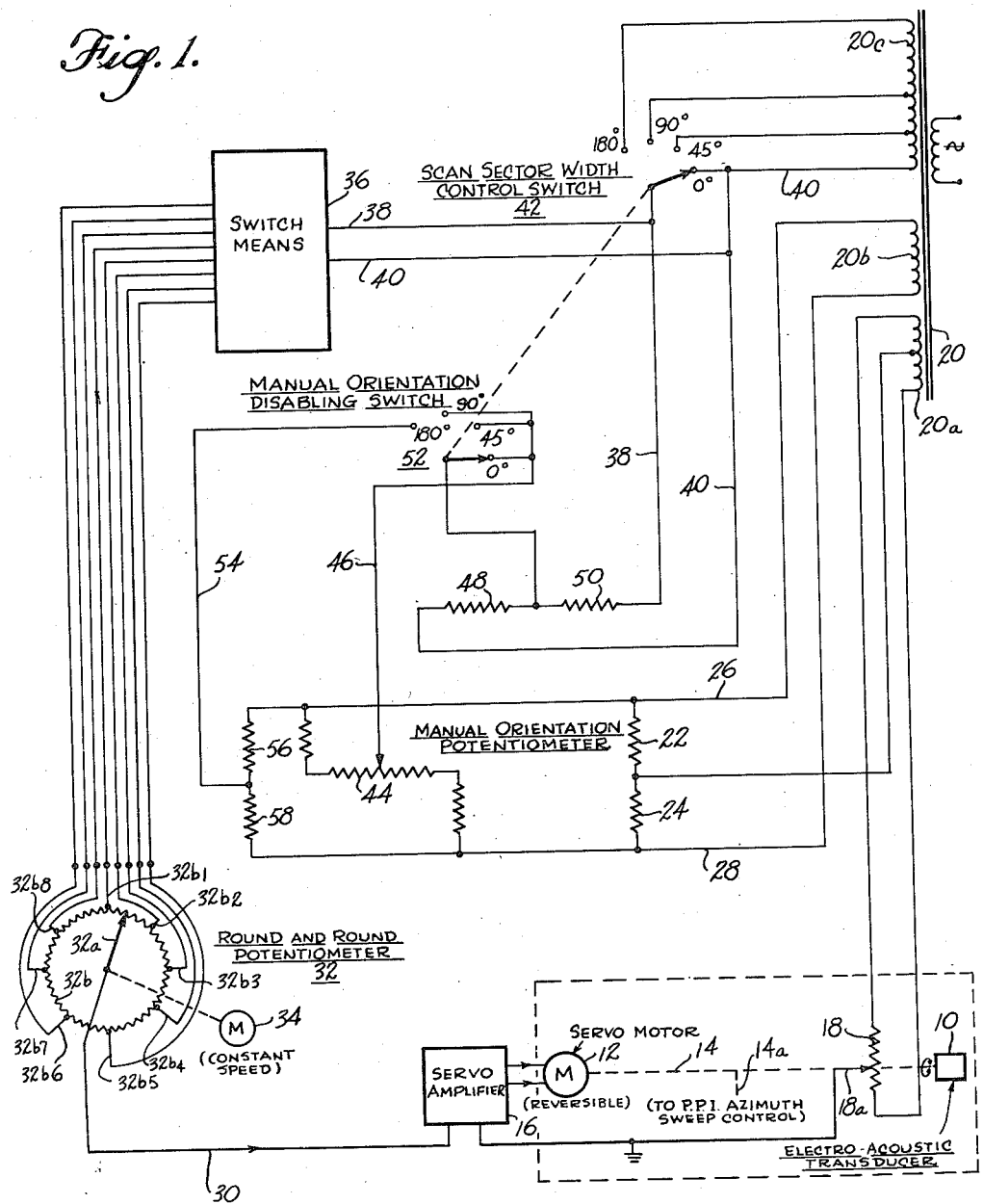
Figure 1 is a simplified schematic diagram of the improved sector scan control circuit.

Referring to Figure 1, the sonar transducer 10 is mechanically scanned by the reversible servomotor 12 and drive shaft 14. A connection 14a from this shaft may be provided to operate the azimuth sweep controls of a conventional PPI cathode ray indicator (not shown) or other indicator device. The motor 12 is controlled in accordance with voltages developed in a normally balanced bridge circuit to be described, such voltages being applied to servoamplifier 16 energizing the motor. One leg of the normally balanced bridge circuit incorporates a follow-up potentiometer 18 having its wiper 18a mechanically driven by the servomotor 12 in a sense to restore balance in the bridge circuit, that is to reduce the input voltage of amplifier 16 to zero. The winding terminals of this potentiometer are connected to the secondary 20a of the power transformer 20. This secondary winding has a mid-tap connected to the mid-point of a voltage divider comprising the equal resistors 22 and 24 connected in series between bridge circuit conductors 26 and 28 energized by the secondary 20b of the transformer 20. Potentiometer wiper 18a is electrically grounded; hence movement of this wiper has the effect of varying the voltages of conductors 26 and 28 equally and oppositely with respect to ground.

Incorporated in the opposite end of the bridge circuit being referred to is a continuous 360-degree-wound potentiometer 32, designated the "round and round" potentiometer. The wiper arm 32a of this potentiometer is mechanically rotated by the constant-speed motor 34 and is connected electrically to the servo amplified input conductor 30. As will later appear the amplitude-modulated voltages developed by this rotating wiper are applied to the servoamplifier input in bucking relation to the follow-up potentiometer voltages and the result is a reciprocating motion of the follow-up wiper 18a effected by servomotor energization.

Potentiometer winding 32b has a plurality of pairs of energizing taps arranged at uniform intervals about its circumference, there being eight such taps in the example located at 45-degree spacings. These taps are designated consecutively 32b1, 32b2 . . . 32b8. The circuit further includes switch means 36 by which the voltage between bridge circuit conductors 38 and 40 may be applied to selected numbers of pairs of round and round potentiometer taps with alternately opposite polarity of the taps so energized. As later described by reference to Figure 2, the switch means 36 provides three settings in the present example. In one of these the voltage between conductors 38 and 40 is applied only to the opposing taps 32b1 and 32b5. In a second setting of said switch means such voltage is applied to these taps and the pair 32b3 and 32b7, whereas in the third setting it is applied to all eight of the taps. In the first case tap 32b1 is connected to conductor 38, for instance, and tap 32b5 to conductor 40. In the second case taps 32b1 and 32b5 are both connected to conductor 38 while taps 32b3 and 32b7 are connected to conductor 40. In the third instance taps 32b1, 32b3, 32b5 and 32b7 are connected to conductor 38 while the four remaining taps are connected to conductor 40. The effect of changing from the first to the second settings of switch means 36 is to double the triangular wave modulation frequency of the alternating voltage of wiper 32a, whereas the effect of changing from the second to the third setting is to redouble this frequency. The sector scan frequency of transducer 10 is thus controlled by switch means 36.

In order to vary the amplitude of the voltage applied to the round and round potentiometer taps, hence the sector scan angle, transformer 20 has a third winding 20c with spaced taps. One end of this winding is connected to conductor 40 while the opposite end and selected intermediate voltage points or taps on the winding are connected to respectively different contacts of a sector scan width control switch 42, the arm of which is connected to conductor 38. In the example the switch 42 has four contacts. The two intermediate contacts are connected respectively to the half-voltage and quarter-voltage points of winding 20c. In the initial position of the switch 42 zero voltage is applied between conductors 38 and 40, and as will later appear this produces a sector scan angle of zero, whereas in the successively advanced settings of the switch respectively applying one-fourth, one-half and full voltage of the transformer secondary 20c to the opposite polarity taps of round and round potentiometer 32, sector scan angles of 45, 90 and 180 degrees, respectively, are produced.

The complete bridge circuit controlling energization of the servo amplifier 16 further comprises a manual orientation potentiometer 44 connected between the conductors 26 and 28. The wiper of this potentiometer is connected by way of conductor 46 to the mid-point of a voltage divider comprising equal resistors 48 and 50 connected across conductors 38 and 40. A four-position switch 52, mechanically coordinated with the sector width control switch 42, applies the voltage of conductor 46 to the mid-point of the voltage divider 48, 50 in the three positions of the switches representing zero scan angle (i. e., fixed transducer), 45-degree sector width and 90-degree sector width, whereas in the fourth position of the switches corresponding to the 180-degree sector width the mid-point of voltage divider 48, 50 is connected by way of conductor 54 to the mid-point of another voltage divider comprising the equal resistances 56 and 58 connected in series between conductors 26 and 28. In this latter position of switches 42 and 52 the manual orientation potentiometer 44 is therefore disconnected from the control bridge circuit comprising voltage divider 48, 50; hence the 180-degree sector scan setting of the system is always fixed with respect to the heading of the vessel.

Only the apparatus enclosed by the dotted rectangle in Figure 1 need be mounted at or in physical association with the transducer in the bottom of the vessel. The remaining apparatus may be mounted in any desired location.

In the operation of the basic circuit arrangement illustrated in Figure 1, the round and round potentiometer wiper 32a is rotated continuously at constant speed in all sector width settings of switches 42 and 52, preferably including the zero width or fixed transducer setting thereof. If the follow-up potentiometer were not moved by the servomotor 12 to reduce the positional error voltage in the servo "loop," the conductor 30 would carry alternating voltage of alternately increasing and decreasing amplitude, with the phase of such alternating voltage reversing every half cycle of the modulation envelope. The amplitude of this triangular wave modulation envelope, that is the maximum alternating voltage amplitude, applied to the servo amplifier input under the assumed condition of a fixed follow-up potentiometer wiper would be either zero, one-fourth, one-half or the full voltage of transformer secondary 20c, depending upon the setting of switches 42 and 52. The frequency of this triangular wave modulation envelope is determined by the number of pairs of round and round potentiometer taps selected for energization by switch means 36. If but two of these taps, such as 32b1 and 32b5, are selected the triangular modulation wave frequency will be equal to the rotational frequency of wiper 32a, whereas this modulation wave frequency may be doubled by selecting four taps and redoubled by selecting eight taps for energization as previously described. In effect, therefore, the round and round potentiometer 32, switch means 36, switch 42, and transformer secondary 20c comprise a generator of alternating voltage amplitude modulated by a triangular wave of variable frequency and amplitude, and with phase reversals of the alternating voltage every half cycle of the modulation wave.

By applying this amplitude-modulated alternating voltage to the input of servo amplifier 16, servomotor 12, hence transducer 10, is caused to rotate first in one direction and then the other, suitable circuit arrangements of a conventional nature being made in the amplifier by which the direction of motor rotation is controlled by alternating voltage phase relationship to a reference alternating voltage applied by means not shown. The actual speed and limits of transducer scan movement produced by servomotor 12 are partly dependent on the amplitude of alternating voltage applied to the follow-up potentiometer 18 by transformer secondary 20a. The voltage to ground of follow-up wiper 18a is added algebraically to the potentials of conductors 38 and 40 and bucks or tends to neutralize the voltage to ground otherwise derived by round and round potentiometer wiper 32a. Thus as the amplitude of the voltage to ground of conductor 30 tends to vary with rotation of the round and round potentiometer the servomotor is thereby energized to move follow-up wiper 18a in a sense and at a rate preventing such voltage from becoming large. This positional error voltage may be kept very small with a high-gain servoamplifier and a sensitively responsive servomotor.

In effect, therefore, the instantaneous rotated position of the follow-up wiper 18a, hence of the transducer 10, is continuously representative of the instantaneous value of the triangular modulation wave being generated by the round and round potentiometer. The limits of sector scan thus produced are therefore established by the amplitude of alternating voltage applied to the round and round potentiometer winding taps. In the example the three applied voltages (besides zero) respectively produce 45-degree, 90-degree and 180-degree sector scan movements of the transducer.

In the 180-degree scan angle setting of switches 42 and 52 the potentials of conductors 38 and 40 are equally above and below ground potential, when wiper 18a is centered since conductor 54 is at the same potential as the mid-tap of transformer secondary 20a and the latter is at the potential of follow-up wiper 18a which is grounded as shown. As a result the orientation of the 180-degree sector scan angle is fixed, preferably with its bisector aligned with the vessel heading. However, in the other three positions of these switches the manual orientation potentiometer 44 provides a means of adding a variable alternating voltage to that produced by the follow-up potentiometer, such variable voltage being reversible as to phase, relative to the voltage between conductors 38 and 40. In the 45-degree and 90-degree settings of switches 42 and 52 the setting of potentiometer 44 thereby establishes the mean position of follow-up wiper 18a, hence of the transducer 10. In the zero position of these coordinated switches potentiometer 44 becomes a means of training the transducer entirely by manual control and without automatic sector scan. In either case the mid-position of the wiper of potentiometer 44 represents the dead-ahead position of the transducer. The transducer may be rotated either to port or starboard by advancing this wiper in one direction or the other out of its mid-position.

Figure 2:
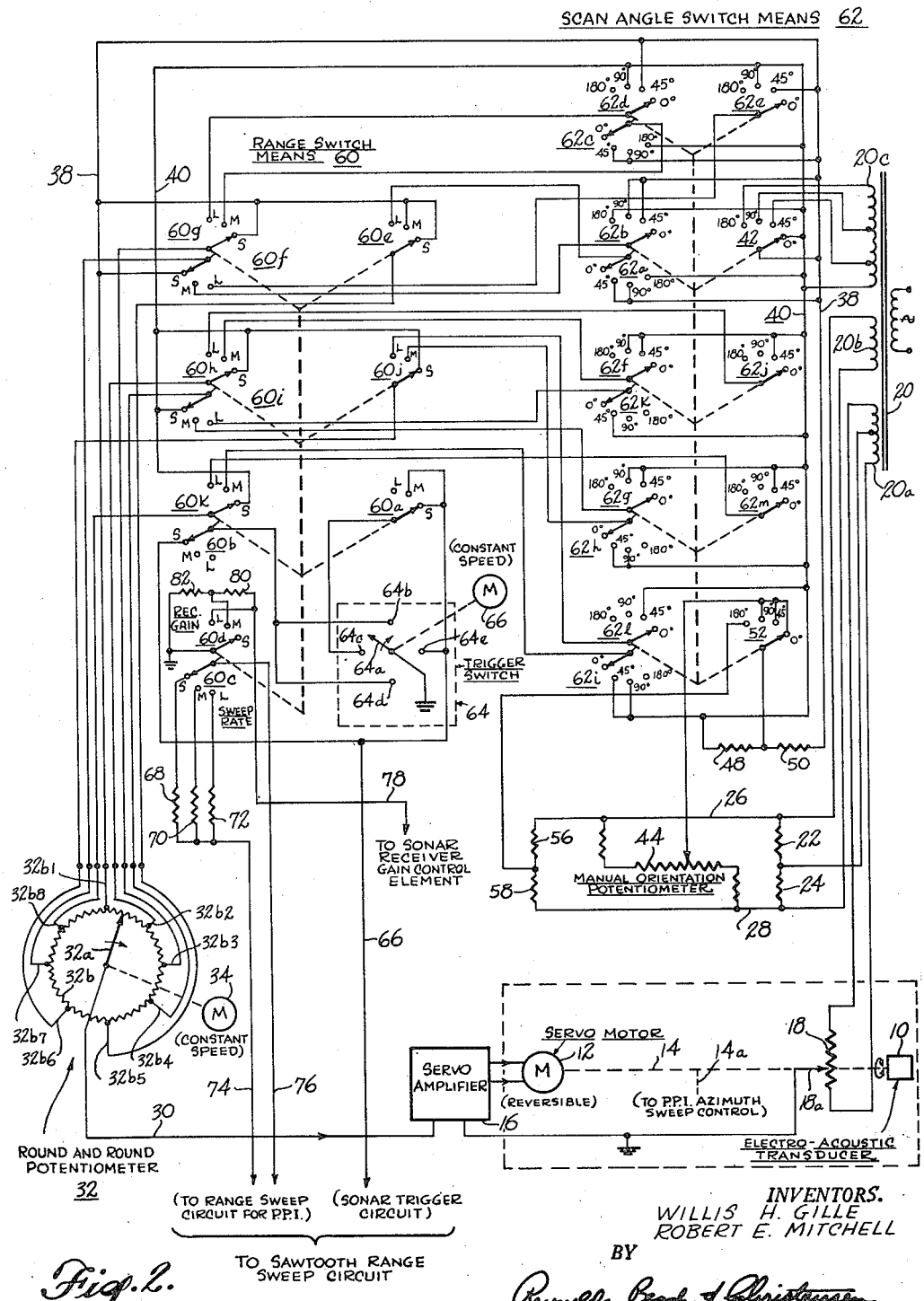
Figure 2 is a schematic diagram of the improved sector scan control circuit embodied in a sonar system the switching details of which are more completely illustrated.

In Figure 2 means are provided mechanically coordinating the range settings and sector scan settings in a sonar system embodying the invention. In general it will be noted that two ganged switch groups are employed, one the range switch means 60 (which has no direct counterpart in Figure 1) and the sector angle switch means 62 likewise having no direct counterpart in Figure 1 because of the feature of mechanical coordination to be described. As will become clear, the manual settings of these two groups of ganged switches determine not only the sector scan width and operating range of the system but also the sector scan rate or period. Parts corresponding to like numbered parts in Figure 1 will not be described again.

The range switch means 60 has three available settings represented by the contacts labeled S, M and L, corresponding respectively to short, medium and long-range operation of the sonar device. A motor-driven trigger switch 64 driven at constant speed by a motor 66 provides the timing of transmitted pulses in the sonar device by periodically grounding the conductor 66 leading to the sonar trigger circuit (not shown). The rotary arm 64a of the trigger switch is grounded and comes into contact successively with four equally-spaced stationary contacts 64b, 64c, 64d and 64e. Trigger contact 64c is connected to the arm of range switch unit 60a, and contacts 64b and 64d to the arm of range switch unit 60b. Contact 64e is connected directly to conductor 66 and also to the S and M contacts of range switch unit 60a. Because of these range switch unit connections, the trigger switch arm 64a grounds the conductor 66 once every revolution when the range switch units are in the L or long-range position, twice every revolution when in the intermediate or M position and four times every revolution when in the S position. Accordingly the "L" setting of the range switch 60 produces a sonar operating range (i. e. pulse to pulse interval) twice that of the "M" setting, and the latter in turn produces an operating range twice that of the "S" position of this switch.

The illustrative sonar device may incorporate a cathode ray indicator (not shown) of the PPI type, including a sawtooth sweep circuit for deflecting the cathode ray tube beam at a linear rate for range indication purposes, and azimuth deflection means controlled by the shaft take-off 14a in conventional or suitable manner, the details of which are not here important. The periodic range sweep of the cathode ray tube beam is initiated simultaneously with each transmitted pulse by synchronously triggering the indicator range sweep circuit with the system transmitter under control of the motor-driven switch 64. In order to utilize the full cathode ray tube screen area for display purposes at each of the three range settings the slope or pitch of the sawtooth range sweep voltages must be varied inversely with pulse repetition rate. For this purpose a switch unit 60c of the range switch means 60 is provided having its three stationary contacts S, M and L connected respectively to successively different size resistors 68, 70 and 72 determining sawtooth wave generator time constant.

The conductor 78 leading to the receiver gain control element (not shown) is connected to the contact L of switch unit 60d and to one side of the voltage divider comprising series-connected resistors 80 and 82. The opposite side of this voltage divider is grounded. The M contact of this switch unit is connected to the junction between resistors 80 and 82 whereas the S contact thereof is connected directly to the conductor 78. The arm of the switch is grounded. By shifting the position of the switch 60d from the S to the M position and then to the L position corresponding to progressively greater operating range in the sonar device the receiver gain is increased by appropriate amounts due to the increase of resistance inserted between conductor 78 and ground. It is found that such a variation of receiver gain with range setting in a sonar device provides an improvement in the discernability of reflecting objects in the field of search. Additional refinements such as cyclic automatic gain control may also be employed to advantage in such a system.

The electrical connections between the several taps of the round and round potentiometer winding, the terminals of the range switch 60 and the terminals of the scan angle switch 62 are such that in the maximum scan angle (180-degree) setting of the latter, a change in the sonar operating range effected by a repositioning of range switch 60 produces an inversely proportional change in the angular scan rate or sector scan frequency. Assuming the constant speed motor 34 to be turning at a rate of one revolution in forty-five seconds, positioning of the range switch 60 in the L position wherein potentiometer taps 32b1 and 32b5 alone are energized results in a sector scan period of forty-five seconds, representing the time required for the transducer to be moved back and forth through one complete scan cycle. The energizing potential for tap 32b1 is applied by a direct connection from conductor 38, and that for tap 32b5 by a connection from conductor 40 formed through the L contact of range switch unit 60e and the 180-degree contact of sector angle switch unit 62a.

With the scan angle switch means 62 remaining in the 180-degree sector angle position, shifting of the range switch 60 from the L to the M position results in halving the sector scan period, that is, in a reduction from 45 seconds to 22.5 seconds. Under these conditions potentiometer taps 32b1 and 32b5 are energized by the same potential, representing that of energized conductor 38, whereas the intermediate taps 32b3 and 32b7, displaced 90 degrees from the first-mentioned pair of taps in terms of wiper rotation, are energized by the opposite potential of energized conductor 40. The tap 32b5 is connected to conductor 38 through the M contact of range switch unit 60e. The tap 32b7 is connected to conductor 40 through the M contact of range switch unit 60f, and the 180-degree contact of sector angle switch unit 62b. The tap 32b3 is connected to conductor 40 through the M contact of range switch unit 60g and the 180-degree sector contact of sector angle switch unit 62c. Thus one complete revolution of the round and round potentiometer wiper 32a produces two complete cycles of the triangular wave amplitude variations and four phase reversals of the alternating voltage derived by this wiper for application to conductor 30. This results in two complete sector scan cycles of the transducer 10 for one rotation of wiper 32a.

With the sector angle switch means 62 remaining in the 180-degree sector position, shifting of the range switch means from the M position to the S position, that is to the minimum range setting of the sonar device, results in a re-halving of the sector scan period, that is, in a reduction thereof from 22.5 seconds to 11.25 seconds. This is the result of connecting the round and round potentiometer taps 32b1, 32b3, 32b5 and 32b7 to the energized conductor 38, and the intermediate taps 32b2, 32b4, 32b6 and 32b8 to the oppositely energized conductor 40. Under these conditions tap 32b3 is connected to conductor 38 through the S contact of range switch unit 60g, tap 32b5 is connected to conductor 38 through the S contact of range switch unit 60e, and tap 32b7 is connected to conductor 38 through the S contact of range switch 60f. At the same time, tap 32b2 is connected to energized conductor 40 through the S contact of range switch unit 60h, tap 32b4 is connected to conductor 40 through the S contact of range switch unit 60i, tap 32b6 is connected to conductor 40 through the S contact of range switch unit 60j, and tap 32b8 is connected to conductor 40 through the S contact of range switch unit 60k. Hence, one complete revolution of the round and round potentiometer wiper 32a results in four complete triangular wave modulation cycles and eight phase reversals of the alternating voltage applied by the wiper 32a to the conductor 30 and four complete sector scan cycles of the transducer 10.

By shifting the sector angle switch means 62 from the 180-degree sector position to the 90-degree sector position, manipulation of the range switch means 60 between its various positions has a different effect on sector scan period and angular scanning rate. In the L position of the range switch 60 two complete sector scan cycles per revolution of the round and round potentiometer wiper 32a are produced, whereas in both the M and S positions of the range switch four complete sector scan cycles of the transducer are produced per revolution of the round and round potentiometer wiper. In the L position of the range switch the sector scan period is 22.5 seconds under the assumed conditions stated above, whereas in the M and S positions the sector scan period is 11.25 seconds.

With the scan angle switch 62 set in the 90-degree sector position, and the range switch 60 set in the L position, potentiometer taps 32b1 and 32b5 are connected to the energized conductor 38 while the intermediate taps 32b3 and 32b7 are connected to the oppositely energized conductor 40. Tap 32b5 is connected to conductor 38 through the L contact of range switch 60e and the 90-degree sector contact of sector angle switch unit 62a. Tap 32b3 is connected to conductor 40 through the L contact of range switch unit 60g and the 90-degree sector contact of sector angle switch unit 62d, while tap 32b7 is connected to conductor 40 through the L contact of range switch unit 60f and the 90-degree sector contact of scan angle switch unit 62e.

In the M position of range switch unit 60, with the sector angle switch maintained in its 90-degree sector angle setting, the potential of conductor 38 is applied to taps 32b1, 32b3, 32b5 and 32b7, whereas that of the potential of conductor 40 is applied to the intermediate set of four taps. Under these conditions conductor 38 is connected to tap 32b3 through the M contact of range switch unit 60g and the 90-degree sector contact of scan angle switch unit 62c, to tap 32b5 through the M contact of range switch unit 60e, and to tap 32b7 through the M contact of range switch unit 60f and the 90-degree sector contact of sector angle switch unit 62b. Conductor 40 is connected to tap 32b2 through the M contact of range switch unit 60h and the 90-degree sector contact of sector angle switch unit 62f, to tap 32b4 through the M contact of range switch unit 60i, and the 90-degree sector contact of sector angle switch unit 62g, to tap 32b6 through the M contact of range switch unit 60j and the 90-degree sector contact of sector angle switch unit 62h, and to tap 32b8 through the M contact of range switch unit 60k and the 90-degree sector contact of sector angle switch unit 62i.

With the scan angle switch 62 remaining in the 90-degree sector position, the effect of switching the range switch 60 to the S position, representing the minimum range setting of the sonar device, is to preserve the same 11.25 second scan period as with the M or medium range setting of the range switch, although some of the connections applying potential to the round and round potentiometer taps differ. Thus the potential of conductor 38 is applied directly to tap 32b1, while being applied to tap 32b3 through the S contact of range switch unit 60g, to tap 32b5 through the S contact of range switch unit 60e, and to tap 32b7 through the S contact of range switch unit 60f. On the other hand, the potential of conductor 40 is applied to tap 32b2 through the S contact of range switch unit 60h, to tap 32b4 through the S contact of range switch unit 60i, to tap 32b6 through the S contact of range switch unit 60j, and to tap 32b8 through the S contact of range switch unit 60k.

In the 45-degree sector position of the sector angle switch 62 the scan period is the same (11.25 seconds) for all settings of switch 60. In the S position of range switch 60 conductor 38 is connected to round and round potentiometer tap 32b3 through the S contact of range switch unit 60g, to tap 32b5 through contact S of range switch unit 60e, and to tap 32b7 through contact S of range switch unit 60f. Conductor 40 is connected to potentiometer tap 32b2 through contact S of range switch unit 60h, to tap 32b4 through contact S of range switch unit 60i, to tap 32b6 through contact S of range switch unit 60j, and to tap 32b8 through contact S of range switch unit 60k.

With switch 62 remaining in the 45-degree setting, in the M or intermediate range setting of range switch 60 conductor 38 is connected to potentiometer tap 32b3 through the M contact of range switch unit 60g and the 45-degree sector contact of sector angle switch unit 62c, to tap 32b5 through the M contact of range switch unit 60e, and to tap 32b7 through the M contact of range switch unit 60f and the 45-degree sector contact of switch unit 62b. The potential of conductor 40 is applied to tap 32b2 through the M contact of range switch unit 60h and the 45-degree sector contact of sector angle switch unit 62f, to tap 32b4 through the M contact of range switch unit 60i and the 45-degree sector contact of sector angle switch unit 62g, to tap 32b6 through the M contact of range switch unit 60j and the 45-degree sector contact of scan angle switch unit 62h, and to tap 32b8 through the M contact of range switch unit 60k and the 45-degree sector contact of sector angle switch unit 62i.

With switch 62 remaining in the 45-degree setting, in the L position of the range switch 60 the potential of conductor 38 is applied to potentiometer tap 32b3 through the L contact of range switch unit 60g and the 45-degree sector contact of angle switch unit 62d, to the tap 32b5 through the L contact of range switch unit 60e and the 45-degree sector contact of sector angle switch unit 62a, and to tap 32b7 through the L contact of range switch unit 60f and the 45-degree sector contact of sector angle switch unit 62e. The potential of conductor 40 is applied to tap 32b2 through the L contact of range switch unit 60h and the 45-degree sector contact of sector angle switch unit 62j, to tap 32b4 through the L contact of range switch unit 60i and the 45-degree sector contact of sector angle switch unit 62k, to tap 32b6 through the L contact of range switch unit 60j and the 45-degree sector contact of sector angle switch unit 62l, and to the tap 32b8 through the L contact of range switch unit 60k and the 45-degree sector contact of the sector angle switch unit 62m.

The following table of values summarizes the available settings of the sector scan control circuit shown in Figure 2 under the numerical assumptions set forth hereinabove by way of example:

*Table of operating ranges and sector scan angles and periods obtainable with sonar device incorporating control circuit of Figure 2*

| Range (Controlled by switch 60) | Sector Scan Angle (Controlled by Switch 62), degrees | Sector Scan Cycle Period (Result of Combined Settings of Switches 60 and 62), seconds |
| --- | --- | --- |
| 400 feet (S) | 180 | 11.25 |
|  | 90 | 11.25 |
|  | 45 | 11.25 |
|  | 0 | 0 |
| 800 feet (M) | 180 | 22.5 |
|  | 90 | 11.25 |
|  | 45 | 11.25 |
|  | 0 | 0 |
| 1,600 feet (L) | 180 | 45 |
|  | 90 | 22.5 |
|  | 45 | 11.25 |
|  | 0 | 0 |

It will be observed from the above table that in the 180-degree sector angle position of switch 62, the sector scan period is varied inversely with operating range, and that the same is true in the 90-degree setting of switch 62, but in the latter instance only when changing between the two range settings L and M. When changing between the M and S range settings of switch 60, in the 90-degree setting of switch 62, no change in sector scan period occurs. Likewise in the 45-degree setting of switch 62 no change in sector scan period occurs when operating range is varied. Such a control arrangement thereby provides an optimum relationship between range and angular scanning rate when maximum permissible scanning rate is important, while sparing circuit complexity required for co-ordination between range and sector scan controls under conditions not requiring such coordination.

In the zero sector width setting of the sector angle switch 62 all taps of the round and round potentiometer are at the same potential, which is that applied by the manual orientation potentiometer 44 through the zero sector contact of sector angle switch unit 52, the voltage divider resistors 48 and 50, and the conductors 38 and 40 shorted together by the sector angle switch unit 42 in its zero sector angle position as illustrated in the figure. By adjustment of the manual orientation potentiometer wiper, the amplitude and phase of alternating voltage applied to conductor 30 may be varied, thereby producing follow-up movement of the wiper of follow-up potentiometer 18, hence of transducer 10. As previously explained, the mean position of the transducer and of the follow-up potentiometer wiper in the 45- and 90-degree sector scan settings of sector angle switch unit 52 may also be varied by adjustment of the manual orientation potentiometer. However, in the 180-degree sector position of sector angle switch unit 52 the manual orientation potentiometer is disconnected from the round and round potentiometer taps and replaced by a connection to the mid-point of the voltage divider comprising resistors 56 and 58.

It will be apparent that numerous changes and modifications may be made in the illustrative apparatus without departing from the characterizing features involved comprising the present invention. For instance it is obvious that the control circuit may be operated by direct current instead of alternating current. In that event the round and round potentiometer would generate an alternating direct voltage wave of triangular wave form, as the equivalent of the similarly generated triangular modulation wave envelope generated by the illustrated apparatus. There would be no essential distinction between these two results, and reference to either in the appended claims is intended to embrace both, since the servomechanism circuits for producing reciprocating motion from either form of such triangular alternating voltage wave are generally similar. The invention is not necessarily limited, therefore, by the details of illustration herein.

We claim as our invention:

1. Apparatus for reciprocating a driven element between variably spaced positional limits in variable time periods comprising servo means drivingly connected to said element, a normally balanced bridge circuit including a follow-up device energizingly connected to said servo means and mechanically driven by said servo means in a sense to restore circuit balance, and means applying progressive unbalance voltages to said circuit comprising endless rotational potentiometer means including endless winding means, a wiper for said winding connected to said bridge circuit for applying unbalance voltages thereto, and means effecting unidirectional relative rotation between said winding and said wiper, said winding having a plurality of pairs of energizing taps arranged at interval spacings therearound, a voltage source having means selectively adjustable to vary the output voltage thereof, and means applying said output voltage to said taps with alternately opposite polarity of successively adjacent taps receiving such voltage, said last-mentioned means including selector switch means having contacts connected to said taps in a circuit arrangement permitting selecting at will the number of pairs of taps receiving said voltage by operation of said switch means.

2. The combination defined in claim 1, wherein the voltage source means are adjustable for varying the source voltage through a range from substantially zero voltage, and manually adjustable means for balancing the bridge circuit in different positions of the driven element, whereby the mean position of the reciprocated driven element may be varied at will and whereby in the zero voltage condition of said voltage source means said driven element may be moved by adjustive repositioning of said manually adjustable means.

3. Apparatus for reciprocating a driven element between spaced positional limits in variable time periods comprising servo means drivingly connected to said element, a normally balanced bridge circuit including a follow-up device energizingly connected to said servo means and mechanically driven by said servo means in a sense to restore circuit balance, and means applying progressive unbalance voltages to said circuit comprising endless rotational potentiometer means including endless winding means, a wiper for said winding connected to said bridge circuit for applying unbalance voltages thereto, and means effecting unidirectional relative rotation between said winding and said wiper, said winding having a plurality of pairs of energizing taps arranged at interval spacings therearound, a voltage source, and means applying said source voltage to said taps with alternately opposite polarity of successively adjacent taps receiving such voltage, said last-mentioned means including selector switch means having contacts connected to said taps in a circuit arrangement permitting selecting at will the number of pairs of taps receiving said voltage by operation of said switch means.

4. The apparatus defined in claim 3, and means adjustable at will to vary the source voltage applied to the energizing taps of the winding.

5. Apparatus for reciprocating a mechanically driven element between spaced positional limits comprising servo means drivingly connected to said element, a normally balanced bridge circuit including a follow-up device energizingly connected to said servo means and mechanically driven by said servo means in a sense to restore circuit balance, and means applying progressive unbalance voltages to said circuit comprising endless rotational potentiometer means including endless winding means, a wiper for said winding connected to said bridge circuit for applying unbalance voltages thereto, means effecting unidirectional relative rotation between said winding and wiper, said winding having at least one pair of oppositely situated energizing taps, and means applying voltage of constant value to said taps, whereby the voltage applied to said bridge circuit varies in triangular wave form having a peak value corresponding to said voltage value.

6. In combination with a propagative wave energy system including a directionally sensitive wave energy transducer, apparatus for angularly scanning said transducer back and forth between variably spaced positional limits in variable time periods comprising servo means drivingly connected to said transducer, a normally balanced bridge circuit including a follow-up device energizingly connected to said servo means and mechanically driven by said servo means in a sense to restore circuit balance, and means applying progressive unbalance voltages to said circuit comprising endless rotational potentiometer means including endless winding means, a wiper for said winding connected to said bridge circuit for applying unbalance voltages thereto, and means effecting unidirectional relative rotation between said winding and said wiper, said winding having a plurality of pairs of energizing taps arranged at interval spacings therearound, a voltage source having means selectively adjustable to vary the output voltage thereof, and means applying said output voltage to said taps with alternately opposite polarity of successively adjacent taps receiving such voltage, said last-mentioned means including selector switch means having contacts connected to said taps in a circuit arrangement permitting selecting at will the number of pairs of taps receiving said voltage by operation of said switch means.

7. The combination defined in claim 6, wherein the voltage source means are adjustable for varying the source voltage through a range through substantially zero voltage, and manually adjustable means for balancing the bridge circuit in different positions of the transducer, whereby the mean position of the transducer may be varied at will and whereby in the zero voltage condition of said voltage source means said transducer may be moved by adjustive repositioning of said manually adjustable means.

8. In combination with a propagative wave energy system including a directionally sensitive wave energy transducer, apparatus for angularly scanning said transducer back and forth between spaced positional limits in variable time periods comprising servo means drivingly connected to said transducer, a normally balanced bridge circuit including a follow-up device energizingly connected to said servo means and mechanically driven by said servo means in a sense to restore circuit balance, and means applying progressive unbalance voltages to said circuit comprising endless rotational potentiometer means including endless winding means, a wiper for said winding connected to said bridge circuit for applying unbalance voltages thereto, and means effecting unidirectional relative rotation between said winding and said wiper, said winding having a plurality of pairs of energizing taps arranged at interval spacings therearound, a voltage source, and means applying said source voltage to said taps with alternately opposite polarity of successively adjacent taps receiving such voltage, said last-mentioned means including selector switch means having contacts connected to said taps in a circuit arrangement permitting selecting at will the number of pairs of taps receiving said voltage by operation of said switch means.

9. In combination with a propagative wave energy system including a directionally sensitive wave energy transducer, apparatus for angularly scanning said transducer back and forth comprising scan servo means drivingly connected to said transducer, a normally balanced bridge circuit including follow-up means energizingly connected to said servo means and mechanically driven by said servo means in a sense to restore circuit balance, and scan control means applying progressive unbalance alternating voltages to said bridge circuit of triangular wave form including potentiometer means having a winding with a plurality of pairs of energizing taps and means effecting voltage energization of said pairs with alternate polarity of successive taps so energized, and a variable voltage take-off element cooperating with said winding, and means producing substantially continuous relative rotation between said winding and said variable voltage take-off element.

10. In combination with a propagative wave energy system including a directionally sensitive wave energy transducer, apparatus for angularly scanning said transducer back and forth between spaced positional limits comprising servo means drivingly connected to said transducer, a normally balanced bridge circuit including a follow-up device energizingly connected to said servo means and mechanically driven by said servo means in a sense to restore circuit balance, and means applying progressive unbalance voltages to said circuit comprising endless rotational potentiometer means including endless winding means, a wiper for said winding connected to said bridge circuit for applying unbalance voltages thereto, means effecting unidirectional relative rotation between said winding and wiper, said winding having at least one pair of oppositely situated energizing taps, and means applying voltage of constant value to said taps, whereby the voltage applied to said bridge circuit varies in triangular wave form having a peak value corresponding to said voltage value.

11. The combination defined in claim 10, and means for varying the value of voltage applied to the energizing taps of the potentiometer winding and thereby the angular spacing between the scan limits.

References Cited in the file of this patent

UNITED STATES PATENTS

| | | |
|---|---|---|
| 2,218,477 | Parker | Oct. 15, 1940 |
| 2,422,295 | Eaton | June 17, 1947 |
| 2,680,223 | Hammett | June 1, 1954 |